(12) United States Patent
Eagleson et al.

(10) Patent No.: US 6,564,599 B2
(45) Date of Patent: May 20, 2003

(54) TAILGATE LIMITER

(76) Inventors: Mark T. Eagleson, 1223 Sonora Rd., Zanesville, OH (US) 43701; Curt M. Luburgh, 2451 Bonnair Dr., Zanesville, OH (US) 43701

( * ) Notice: Subject to any disclaimer, the term of this patent is extended or adjusted under 35 U.S.C. 154(b) by 0 days.

(21) Appl. No.: 09/957,200

(22) Filed: Sep. 20, 2001

(65) Prior Publication Data

US 2003/0052494 A1 Mar. 20, 2003

(51) Int. Cl.⁷ .................. E05B 65/12; E05B 65/16
(52) U.S. Cl. .................. 70/237; 70/14; 70/164; 70/258; 224/488; 224/489; 224/509; 224/512; 280/507
(58) Field of Search .................. 70/14, 164, 237, 70/238, 258; 280/507; 224/488, 489, 505, 509, 512

(56) References Cited

U.S. PATENT DOCUMENTS

| | | | |
|---|---|---|---|
| 4,819,461 A | * 4/1989 | Pearson | 70/14 |
| 5,104,171 A | 4/1992 | Johnsen et al. | |
| 5,154,459 A | * 10/1992 | Cochran | 292/258 |
| 5,165,743 A | * 11/1992 | Zock | 292/288 |
| 5,265,450 A | 11/1993 | Doyle | |
| 5,707,095 A | 1/1998 | Pribak et al. | |
| 5,823,022 A | 10/1998 | Barker | |
| 5,826,768 A | * 10/1998 | Gamulo | 224/486 |
| 6,000,594 A | * 12/1999 | Chimenti | 224/519 |
| 6,030,019 A | 2/2000 | Stiltner et al. | |
| 6,089,056 A | 7/2000 | Yoda et al. | |
| 6,152,675 A | * 11/2000 | Compton | 414/543 |
| 6,237,377 B1 | * 5/2001 | Vasquez, Sr. | 70/237 |
| 6,390,344 B1 | * 5/2002 | Edgerly | 224/531 |
| 6,409,065 B1 | * 6/2002 | Edgerly | 224/508 |
| 6,427,854 B1 | * 8/2002 | Grossi et al. | 211/85.7 |

FOREIGN PATENT DOCUMENTS

FR  2689468 A1 * 10/1993 ............ B60R/9/10

OTHER PUBLICATIONS

THULE model 948—Ball Mount/Draw Bar bike Carrier. Datasheet [Online]. Thule Corporation, [retrieved on Dec. 10, 2002]. Retrieved from the Internet: <URL: www.thuleracks.com/thule/product.asp?dept_id=8&sku=948>.*

* cited by examiner

Primary Examiner—Anthony Knight
Assistant Examiner—Christopher Boswell
(74) Attorney, Agent, or Firm—Jason H. Foster; Kremblas, Foster, Phillips & Pollick

(57) ABSTRACT

A tailgate limiter for restricting a pickup truck tailgate from being opened. A vertical post is removably mounted in a base which is mounted to the truck. The post impedes the tailgate from opening, thereby preventing theft of objects in the truck bed.

27 Claims, 5 Drawing Sheets

TAILGATE LIMITER

(e) BACKGROUND OF THE INVENTION

1. Field of the Invention

This invention relates generally to a mechanism for preventing, or at least significantly limiting, the opening of a pickup truck or sport utility vehicle tailgate to prevent theft of objects in the bed thereof.

2. Description of the Related Art

Motorcycles, four-wheelers, three-wheelers, go-carts, lawn mowers, and other large, heavy recreational and pleasure vehicles and other objects are often transported in the open beds of pickup trucks. Such objects are tied down in the truck bed for stability during transport, but they are not conveniently secured in such a way that theft becomes substantially difficult. The height of motorcycles and the weight of all large objects make it impractical to enclose the truck bed for security, such as with a truck cap, because maneuvering the large objects into and out of the bed requires the person to stand upright for leverage and balance. Therefore, a security problem exists, because valuable objects are stored in open beds of pickup trucks without being secured.

People often transport their motorcycles in pickup trucks to cycling shows and other events. These people typically stay overnight in hotels and campgrounds that require the trucks to be parked outside in a parking lot. At night, motorcycles and other equipment or pleasure vehicles can be stolen from the pickup trucks by simply lowering the trucks' tailgates and rolling the motorcycles or other objects off.

Because motorcycles and the other kinds of objects discussed above are so heavy, it is only practical to steal them if the tailgate of the truck can be opened. This is because an ordinary person, and indeed, two or three ordinary people, cannot, or will not, lift a motorcycle, four-wheeler or mower over the sidewall or tailgate of a pickup truck. Therefore, the need exists for a security device that prevents the theft of large objects from the open beds of pickup trucks.

(f) BRIEF SUMMARY OF THE INVENTION

The invention is a pickup truck tailgate limiter, which comprises an elongated post and means on the post for removably mounting and locking the post to a pickup truck. The post is designed to be locked within a path of movement of the tailgate for limiting opening of the tailgate to a predetermined, restricted limit, thereby preventing, or at least limiting, opening of the tailgate.

The invention also contemplates a combination of a pickup truck and a post. The preferred combination includes a base mounted and locked to the pickup truck, such as the bumper, hitch or other frame member, and a post removably mounted and locked to the base. The post is mounted in a substantially vertical orientation within a path of movement of the tailgate for limiting opening of the tailgate to a predetermined, restricted limit. The post preferably extends from at least near a lower edge of the tailgate to at least near an upper edge of the tailgate.

(g) BRIEF DESCRIPTION OF THE SEVERAL VIEWS OF THE DRAWINGS

Figure 1:
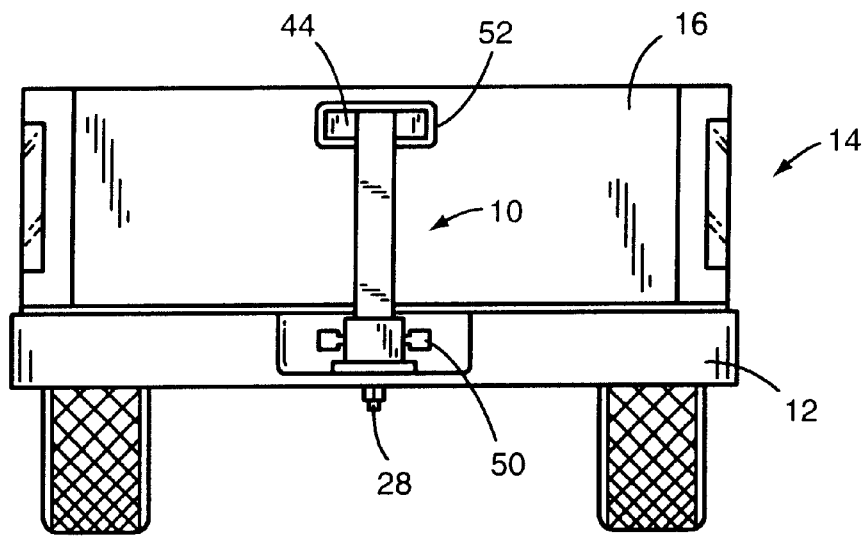
FIG. 1 is an end view illustrating the preferred embodiment of the present invention in an operable position on the bumper of a pickup truck.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

(h) DETAILED DESCRIPTION OF THE INVENTION

The tailgate limiter 10 is shown in FIG. 1 mounted to the bumper 12 of a conventional pickup truck 14. "Pickup truck" is defined as a motorized vehicle of the style commonly referred to as a pickup truck or simply "truck", which has a passenger cabin and a rigidly attached, open bed behind the cabin. Some sport utility vehicles (SUV's) have partially open beds, and therefore are included as pickup trucks. The bed of a pickup truck has sidewalls which extend approximately one foot or more up from a bed floor which supports the payload of the truck. A rear gate, commonly referred to as a tailgate, extends across the opening between the rear ends of the sidewalls and pivots along a hinge axis positioned near a lower edge of the gate or, less commonly, at one or two sides to pivot through a path. The front of the bed is typically formed by an immobile wall extending between the front ends of the sidewalls.

Figure 2:
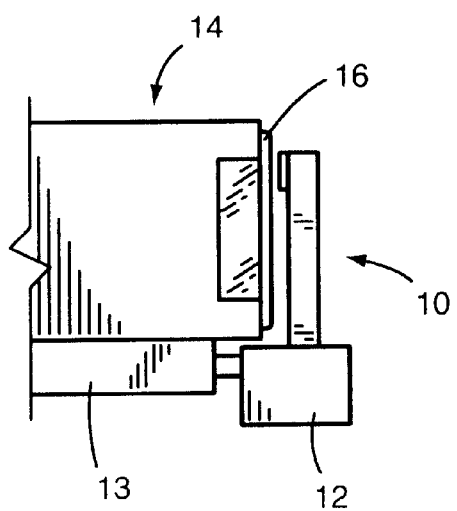
FIG. 2 is a side view illustrating the embodiment of FIG. 1.
Figure 3:
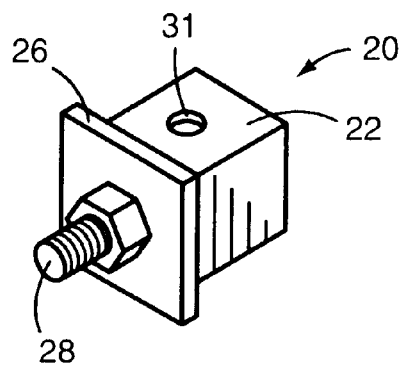
FIG. 3 is a view in perspective illustrating the base of the preferred embodiment of the present invention.

The bumper 12 of the truck 14 mounts to the truck's frame 13 in a conventional manner, as shown in FIG. 2, and extends back from near the rear end of the truck bed to form a mounting point for the limiter 10. The limiter 10 extends from near a lower edge of the tailgate 16 to near an upper edge of the tailgate 16. The limiter 10 mounts at its lower end to the bumper 12, which provides a very rigid, strong support due to its connection to the frame 13.

As shown in FIG. 2, the limiter 10 is in close proximity to the tailgate 16, preferably within six to twelve inches, more preferably within two to four inches, and most preferably within about one inch of the rear surface of the tailgate 16. In its operable position, the limiter 10 is preferably substantially parallel to the plane of the tailgate 16, and is also substantially vertically oriented.

The separate parts of the preferred limiter 10 are shown in detail in FIGS. 3, 4, 5 and 6. A base 20 is made up of a preferably steel, square tubular housing 22 having an opening forming a socket 24 (see FIGS. 3 and 5). The housing 22 is rigidly mounted, such as by welding, to a transverse base plate 26. A bolt 28 is mounted through the base plate 26 and extends coaxially from the housing in a direction opposite to the direction the socket 24 faces. The bolt 28 can be welded or threaded through the plate 26, or preferably freely extends as described below. The bolt 28 extends, in an operable position, through the conventional aperture formed in a truck bumper which is designed for receiving a trailer-hitch ball. As shown in FIG. 1, the bolt 28 passes through this aperture in the bumper 12, and a washer and nut are threaded and tightened onto the bolt 28 on the underside of the bumper 12, thereby rigidly mounting the base 20 to the bumper 12 and connecting it to the frame 13 through the bumper 12. Such a mounting of the base 20 makes removal difficult without the proper tools. The base 20 also has aligned apertures 31 and 32 for removably mounting the second element of the limiter 10 to the base 20.

Figure 4:
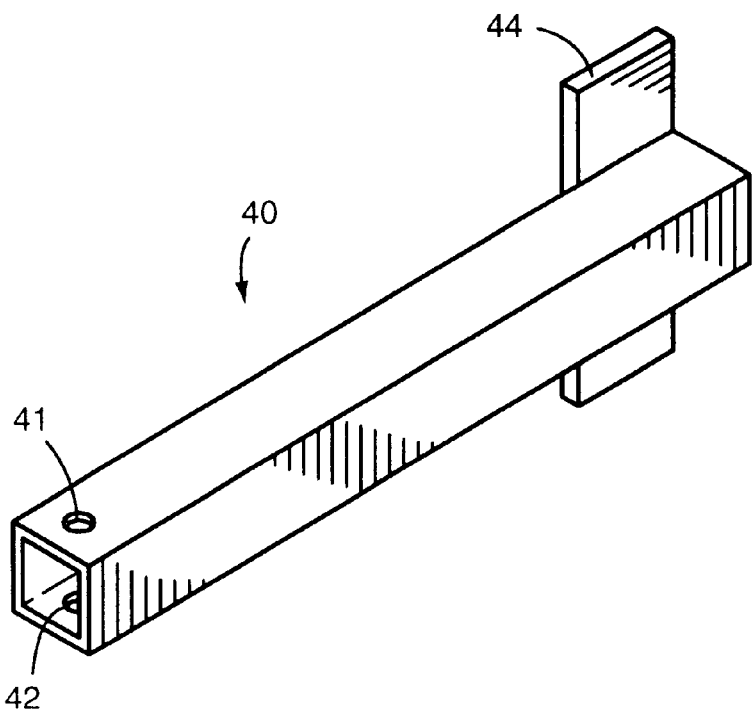
FIG. 4 is a view in perspective illustrating the post of the preferred embodiment of the present invention.
Figure 5:
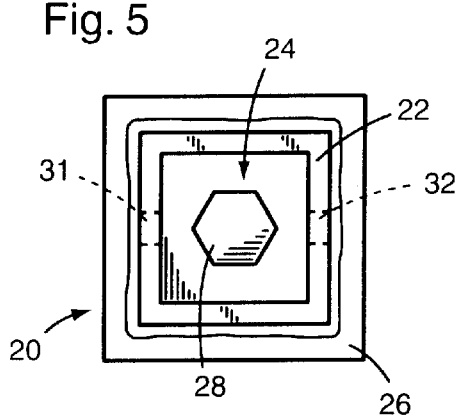
FIG. 5 is top view illustrating the base.
Figure 6:
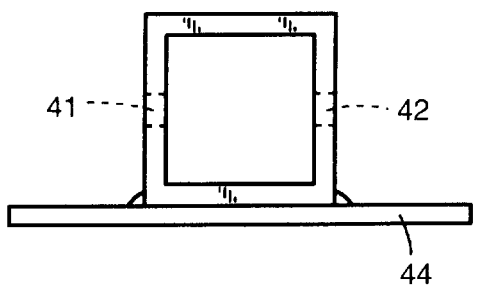
FIG. 6 is a bottom view illustrating the post.

Referring to FIGS. 4 and 6, the second element of the preferred limiter is the post 40, which is an elongated, preferably steel, square tubular member. The top end of the post 40 can be closed by a welded plate or, preferably a plastic cap that is retained by an interference fit. The post 40 has outer dimensions that permit its end to be inserted telescopically within the socket 24 of the base 20. The post has a pair of aligned apertures 41 and 42 that align with the apertures 31 and 32, respectively, in the base 20. A rod, such as the lock 50 shown in FIG. 1, is inserted through these apertures after they are aligned. The lock 50 is then locked to hold the post 40 rigidly in the base 20, thereby restricting removal of the post 40 from the base 20 to those who have keys to the lock 50. The lock 50 is of the type currently sold under the REESE brand of locks for REESE and DRAW-TITE brand hitches.

The length of the post 40 is determined by the dimensions of the truck to which it is going to be mounted. Of course, it is possible that a single post would work for every make, model and year of truck, but this is unlikely. Preferably, each post will be matched to the dimensions of the makes, models and years of trucks for which it is designed so that the post's upper end reaches approximately to the tailgate handle, and preferably to near a top edge of the tailgate in the operable position shown in FIG. 1. For example, the post for a late model full-sized Chevrolet pickup is approximately 22 inches long.

The shape of the posts may also vary from substantially straight for the purpose of accommodating structural features of different trucks while still permitting the post to stay in close proximity to the tailgate when it is in its operable position. For example, a post may have to incorporate a curve to pass around the bumper in order to be positioned close to the tailgate when it is in its operable position.

The post 40 has a rigid, preferably steel plate, handle cover 44 that is similar in size to the handle 52 on the tailgate of the truck to which the limiter 10 is mounted. A piece of scratch-preventing soft material, such as foam tape, is adhered to the handle cover to prevent scratching of the truck's paint during installation and removal of the post 40. When the post 40 is mounted in the base 20, which is the operable position of the post 40 shown in FIGS. 1 and 2, the handle cover 44 which is within inches of the handle 52 blocks anyone from opening the tailgate 16 in the conventional manner by slipping the fingers beneath the handle and pulling. However, even if the handle cover 44 fails to prevent opening of the tailgate, the limiter 10 limits the amount that the tailgate 16 can be opened, as is described next.

The limiter 10 is positioned in close proximity to the tailgate 16, preferably within an inch, and extends from at least near the bottom edge to near an upper edge of the tailgate 16. Because the limiter 10 is mounted close to the truck's tailgate 16, the tailgate 16 cannot hinge open along its normally downward path without contacting the limiter 10. Because the limiter 10 is made of a material which the normal person cannot bend or break, and because the limiter 10 is rigidly connected, whether directly or through other structures such as the bumper, a hitch or body panels, to the frame of the truck, the tailgate cannot displace the limiter 10. Thus, by virtue of the position of the limiter 10 within the path that the tailgate 16 must traverse to be opened, the tailgate cannot be opened any further than when it first contacts the limiter 10. The tailgate is essentially thereby "locked" to prevent removal of the contents of the truck's bed by rolling past the tailgate.

The height of the post is critical, because if the post is so short that the tailgate can be opened far enough to roll objects over and past the tailgate, then the limiter is ineffective. The preferred height of the post 40 is a height that may differ by the truck to which the post will be mounted, but which is sufficient to reach near the top edge of the tailgate when the post is in an operable position. The height of the post will be less in less preferred embodiments, because the lower the top of the post, the more a tailgate can be opened.

Furthermore, because most, if not all, truck tailgates can be removed by tilting them open a significant portion of their path and then lifting them out of their hinges, the relationship of the height of the post and its proximity to the tailgate is critical. As described above, the tailgate can be opened slightly, which is not a security problem so long as the amount the tailgate can be opened is so small that the object in the truck bed cannot be rolled over the tailgate. But in addition, the post must be tall enough, and close enough to the tailgate, that it prevents opening of the tailgate so far that the tailgate can be removed. Therefore, height of the post, proximity to the tailgate and the distances needed for tailgate removal are all factors that will determine whether the device prevents theft of the contents of the truck bed. Removal or almost complete lowering of the tailgate is necessary in order to remove the bed's contents, because of the size and weight of the contents. Thus, the post 40 can be shorter than about the top edge of the tailgate if the post is positioned close enough to the tailgate to prevent opening of the tailgate enough to remove the tailgate.

The limiter can be made, as described above, of square tubular steel, but other materials and shapes are contemplated. For example, aluminum, other non-ferrous alloys including titanium or magnesium, and composite materials, such as fiberglass or carbon fiber combined with epoxy resins, can be used. Additionally, round or other polygonal tubular members can be used. The principle concern with the material chosen is that it be strong enough to resist deformation when the tailgate contacts it. This strength prevents a thief from simply bending or breaking the limiter. Additionally, the material must have properties that make removal of the limiter difficult or obvious. Thus, anyone who wants to remove the limiter without authority has to take an extended period of time to do so without attracting attention, or use tools that are not commonly available or which are readily perceived when they are being used, such as a cutting torch or saw.

In use, the base 20 is rigidly mounted to the bumper of the truck, and the post 40 is removably mounted therein by inserting the hitch lock 50 through the aligned apertures in the two structures. In this state, the truck tailgate 16 is limited in the amount it can be opened, and the contents of the truck bed cannot be removed without being lifted over the sidewalls or tailgate 16 of the truck 14. When it is desired to remove the contents, the user simply removes the lock 50 from the apertures and then lifts the post 40 out of the socket in the base 20. The post 40 can be stored in the locked cabin of the truck, and the tailgate 16 operates in the normal manner by pulling on the handle and lowering the tailgate. The motorcycle or other contents can then be removed in the same manner in which they were loaded.

The preferred means by which the base 20 is connected to the frame of the truck is by extending the bolt 28 through the aperture in the bumper made for a trailer-hitch ball as described above. The bolt can preferably rotate freely within the plate 26. A nut is threaded onto the bolt 28 extending through the bumper, and, after tightening by holding a wrench on the bolt 28, a small screw is inserted and tightened transversely through the nut and into the threads on the bolt's shaft, thereby distorting the threads and making removal of the nut very difficult and time-consuming, and requiring several tools. An adhesive or sealant can be placed in the passage in the nut through which the small screw is driven to make removal even more difficult. Thus, the base 20 is locked to the bumper.

If someone attempts to remove the nut, even after he has removed the small screw, he will not be able to remove the base 20 from the truck unless he also removes the post 40 from the base 20. This is because of the cooperating structures of the bolt 28 and the plate 26. As discussed above, the bolt 28 preferably is rotatably mounted in the plate 26. Thus, removal of the nut from the bolt 28 necessitates placing a wrench on the head of the bolt 28 to hold the bolt 28 for rotation of the nut relative thereto. Placing a wrench on the head of the bolt 28 would not be necessary if there were little or no resistance to relative motion between the nut and bolt 28. However, because of the distortion of the threads of the bolt 28 by the small screw, there is substantial resistance to relative motion, and therefore the bolt must be held during rotation of the nut. In order to place a wrench on the head of the bolt 28, the post 40, which is locked to the base by the hitch lock 50, must be removed. Removal of the hitch lock 50 can only be accomplished with the key or by one who uses loud or very noticeable tools such as a torch or cutting saw. This provides substantial security against unauthorized removal.

Figure 10:
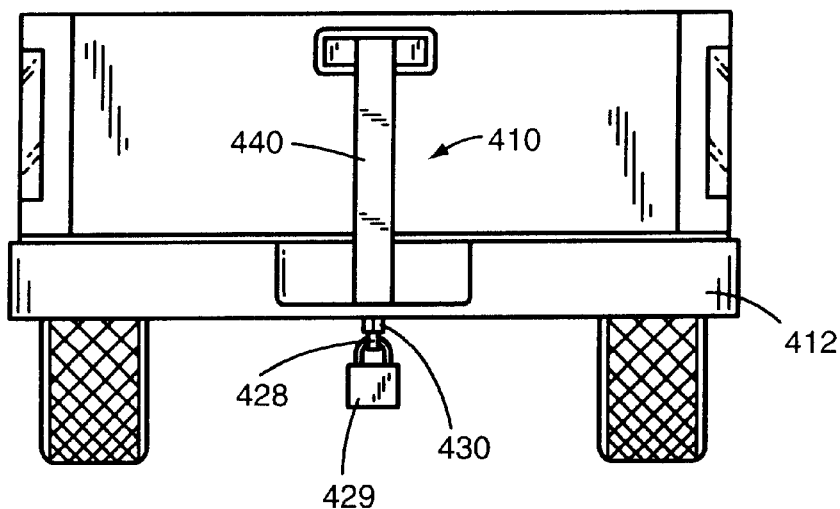
FIG. 10 is an end view illustrating another alternative embodiment of the present invention in an operable position on the bumper of a pickup truck.

Alternatively, of course, there are many other fasteners that can securely mount and lock the base to the bumper or any other part of the truck connected to the truck's frame. For example, the bolt can be mounted to the bumper as described above, and then a conventional padlock 429 can be placed through a perpendicular bore formed through the bolt's shaft beneath the nut as shown in FIG. 10. The padlock 429 prevents removal of the nut, and therefore the bolt, without first unlocking the padlock. Alternatively, specialty fasteners requiring special tools that a thief is unlikely to have when he seeks to remove the limiter 10 can be used as the means for mounting and locking. There are too many means for mounting and locking the limiter to the truck to list, as will be recognized by the skilled artisan after reading the description of the invention.

Figure 7:
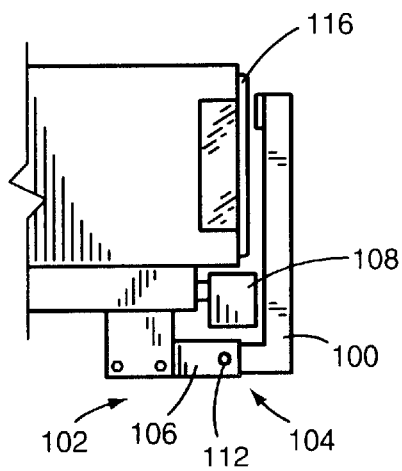
FIG. 7 is a side view illustrating an alternative embodiment of the present invention.

As shown in FIG. 7, an alternative means for connecting the limiter to the truck's frame is to mount a post 100, which has a 90 degree bend, into a conventional trailer hitch 102, such as those sold under the trademark REESE. Such hitches have a square tubular steel member 106 mounted beneath the bumper 108 of a truck. The member 106, which is horizontal and aligned with the truck's longitudinal axis, has a passage 104 that receives the end of the post 100. Transverse apertures aligned on opposite sides of the member 106 align with apertures formed in the inserted part of the post 100, thereby permitting one to lock the post to the hitch in the same manner that hitch tongues are mounted thereto, such as by a lock 112. Thus, the post 100 is positioned and locked within the path of the tailgate 116 for limiting the opening of the tailgate 116 as in the preferred embodiment.

Figure 8:
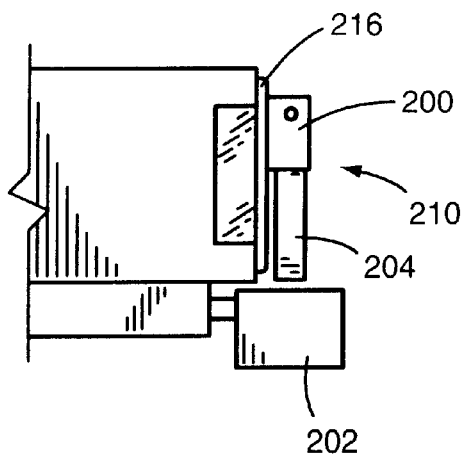
FIG. 8 is a side view illustrating another alternative embodiment of the present invention.

A further alternative is shown in FIG. 8, in which the limiter 210 has a base 200 that is mounted to the tailgate 216. A post 204 is removably mounted in the base 200 and extend towards the bumper 202. Such an alternative embodiment thus has a post 204 that is positioned within the path of the tailgate 216, and abuts against the bumper 202 upon opening of the tailgate. Such an alternative is disadvantageous because the base must be attached to the tailgate, which does not as commonly have objects mounted to it as a bumper or a hitch. However, there may be circumstances in which such an embodiment is desirable.

Figure 9:
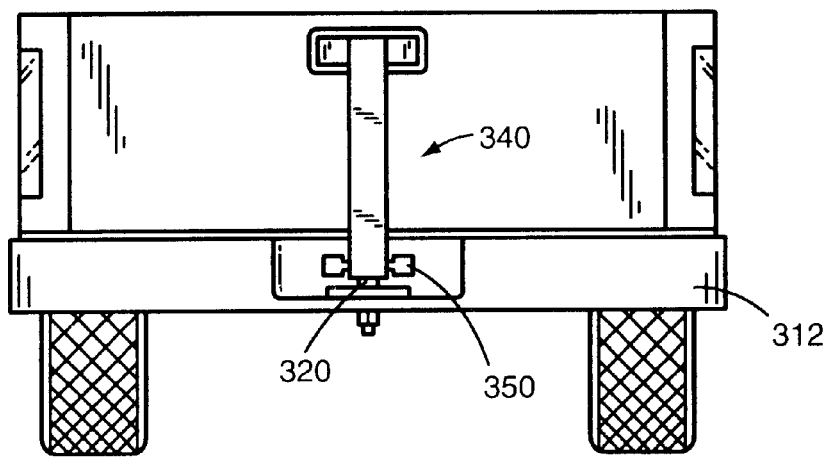
FIG. 9 is an end view illustrating another alternative embodiment of the present invention in an operable position on the bumper of a pickup truck.

Another alternative embodiment of the present invention is shown in FIG. 9, in which the base 320 is mounted to the truck bumper 312. The base 320, however, inserts into a socket formed in the post 340, rather than the vice versa as in the preferred embodiment. A lock 350 is mounted through aligned apertures as in the preferred embodiment.

Still another alternative embodiment of the present invention is shown in FIG. 10, in which the limiter 410 is a single structure made up only of the post 440. The post 440 mounts to the bumper 412 by a threaded shaft 428 extending downwardly from the post 440 through the hitch ball aperture in the bumper 412. A nut 430 threads over the shaft 428 and the lock 429 prevents removal of the nut 430, thereby securing the limiter 410 to the truck. The post 440 must be removed entirely to permit opening of the tailgate.

Figure 11:
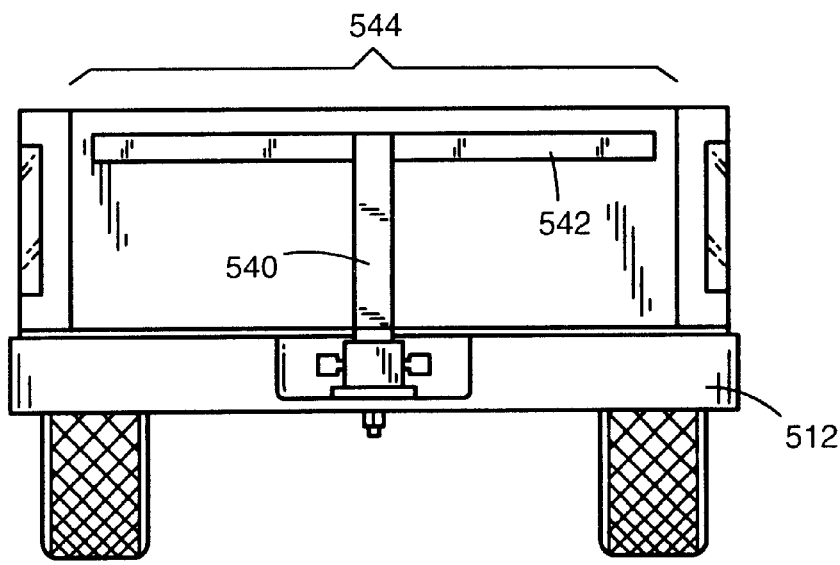
FIG. 11 is an end view illustrating another alternative embodiment of the present invention in an operable position on the bumper of a pickup truck.

Another alternative embodiment is shown in FIG. 11, in which a post 540 as described above for the preferred embodiment is mounted to the bumper 512 of a truck. The post 540, however, differs in that it has a transverse member 542 that spans the majority of the width of the opening 544 for the tailgate. The tailgate is removed in FIG. 11, for example to reduce wind resistance of the vehicle, and the transverse member 542 limits removal of the contents of the truck's bed. The transverse member 542 essentially substitutes for the top edge of the tailgate in its absence. Although smaller items can be slid beneath the transverse member 542, and light items can be lifted over the transverse member 542, motorcycles, mowers and other large, heavy objects are prevented from being removed by the post 540 rigidly, removably connected to the truck frame through the bumper 512, and the transverse member 542 rigidly mounted to the post 540. The transverse member 542 essentially substitutes for the top edge of the tailgate in its absence.

As another alternative embodiment, the base, or the post, could be lockingly clamped around the bumper, or fastened directly to the frame of the truck. These means for connecting the post to the truck's frame provide a post that is positioned and locked within the path of the tailgate.

An alternative means for removably mounting a post to a truck in the path of a tailgate is embodied in a post that is continuously mounted to the truck, but the top part of which is hinged to swing out of the way of the tailgate, after being unlocked, when opening of the tailgate is desired.

The invention uses a lock or locking structure to make movement of the post and/or base out of the path of the tailgate as difficult, time-consuming and noticeable as possible for those without authority (thieves), and as convenient as possible for those with authority (the owner). Such a lock is used between the post and the truck in some embodiments, and between the post and the base in the preferred and other alternative embodiments. The word "lock" and its derivatives, such as "locked" and "locking", are carefully chosen and defined herein.

No lock can completely prevent removal, because given enough time and tools, any lock can be removed. Thus, complete prevention of removal is not the purpose of the lock, because that purpose cannot be realized. Rather, increasing the difficulty in unauthorized removal and noticeability of attempted unauthorized removal are the purposes of the lock. Furthermore, to the extent that the difficulty of removal is increased for thieves, the convenience of removal is often correspondingly reduced for the owner. Therefore, the lock or locking structure that is used in any given embodiment must strike a balance between owner convenience in removal and thief inconvenience in removal.

It is contemplated that there are four kinds of structures that could be used. In order for any of these structures to be considered a "lock" for the purposes of the present invention, they must provide at least some substantial level of difficulty to thieves who try to remove them. If they do not, then they are not "locks" as defined herein, because they provide no substantial security against theft.

First, there are conventional security locks, for example padlocks and hitch locks that are opened with keys or combinations, and other security locks that are opened by optical sensors or with a remote control. Of course, there are other kinds of security locks that are too numerous to list. With such conventional security locks owner convenience is high, and a thief inconvenience is high. However, such security locks can be expensive, and do not normally tighten structures together. Nonetheless, security locks are considered locks for the purpose of the present invention.

Second, there are specialty fasteners that require specialty tools, or a combination of tools and a key or combination, to open. Specialty fasteners cannot be opened as easily by the owner as a security lock, but often they are less expensive and provide a tighter fit. As a disadvantage, thieves can also purchase specialty tools used to remove some specialty fasteners. Therefore, with such fasteners convenience and security are both reduced over conventional security locks, but are high enough to be considered locks for the present invention.

The kinds of specialty fasteners are too numerous to name, but are known to those having ordinary skill in the mechanical fastener art. One example of a novel specialty fastener is the preferred combination described herein of the nut, bolt and screw used for mounting the base to the truck. This fastener is advantageous in tightly fastening the base to the bumper, and because the base will probably never need to be removed by the owner, reduced owner convenience is not a substantial obstacle. Furthermore, cost is reduced over using a security lock. And if the base needs to be removed, the owner can remove it by using the key to remove the post, and then a few normal tools to remove the base from the truck with minimal inconvenience. A thief must remove the lock with a key or by cutting it in order to remove the base from the truck with common tools.

Third, there are ordinary fasteners, such as nuts, bolts and screws, that can be removed easily with commonly available tools, such as wrenches, screwdrivers and pliers. The convenience for the owner is high, although not as high as for security locks, but the inconvenience for thieves is low. Any thief with common tools can open such fasteners, and therefore because their security is so low such fasteners are not considered locks for the purpose of the present invention.

Finally, there are hand-removable fasteners. These include hitch-pins and other fasteners that can be removed by hand without any tools. Such fasteners provide significant convenience for the owner, but almost no inconvenience for thieves. Because there is virtually no security in such devices, they are not considered locks for the purpose of the present invention.

While certain preferred embodiments of the present invention have been disclosed in detail, it is to be understood that various modifications may be adopted without departing from the spirit of the invention or scope of the following claims.

What is claimed is:

1. A pickup truck tailgate limiter, said limiter comprising:
   (a) an elongated post; and
   (b) means on said post for removably mounting and rigidly locking a first end of said post to a pickup truck bumper in the manner of a cantilever within a path of movement of said tailgate for limiting opening of said tailgate wherein, upon removing said post from within the path of said tailgate, said limiter is outside the path of the tailgate.

2. The tailgate limiter in accordance with claim 1, wherein said means includes a base, rigidly mounted to a pickup truck bumper, telescopically received by a socket in said post.

3. The tailgate limiter in accordance with claim 1, wherein said means includes a base having a socket telescopically receiving said post.

4. The tailgate limiter in accordance with claim 1, further comprising a handle cover mounted to said post for extending at least partially over a tailgate handle to restrict access to said handle.

5. The tailgate limiter in accordance with claim 1, further comprising at least one transverse member mounted to said post, said member having a length substantially equal to the width of a tailgate opening for extending substantially across the tailgate opening.

6. A pickup truck tailgate limiter, said limiter comprising:
   (a) an elongated post;
   (b) a base, rigidly mounted to a pickup truck bumper outside a path of movement of a tailgate, having a post-receiving socket into which a first end of said post telescopically and removably mounts;
   (c) means for removably mounting and rigidly locking said post to said base in the manner of a cantilever substantially vertically and within the path of movement of the tailgate for limiting opening of the tailgate; and
   (d) a lock mounted to said base and said post for locking said base to said post.

7. The tailgate limiter in accordance with claim 6, further comprising a handle cover mounted to said post for extending at least partially over a tailgate handle to restrict access to said handle.

8. The tailgate limiter in accordance with claim 6, further comprising a transverse member mounted to said post for extending laterally from the post across a majority of the width of a tailgate opening.

9. A combination pickup truck and post, said post removably connected to a pickup truck bumper and rigidly locked within a path of movement of a tailgate in the manner of a cantilever for limiting opening of the tailgate wherein, upon removing said post from within the path of said tailgate, no structure remains within said path.

10. The combination in accordance with claim 9, further comprising a base rigidly mounted to the pickup truck bumper, wherein said post is removably mounted and locked to said base.

11. The combination in accordance with claim 10, wherein the base telescopically extends into a base-receiving socket in said post.

12. The combination in accordance with claim 10, wherein the post telescopically extends into a post-receiving socket in said base.

13. The combination in accordance with claim 10, wherein the base has a rod that extends through an aperture in the pickup truck bumper.

14. The combination in accordance with claim 9, wherein the post has a substantially vertical orientation.

15. The combination in accordance with claim 14, wherein the post extends from at least near a lower edge of said tailgate and terminates near an upper edge of the tailgate.

16. The combination in accordance with claim 15, further comprising a handle cover mounted to said post and extending at least partially over a tailgate handle for restricting access to the tailgate handle.

17. The combination in accordance with claim 15, further comprising a transverse member mounted to said post and extending laterally from the post across a majority of the width of a tailgate opening.

18. A combination pickup truck and tailgate limiter comprising:
   (a) a base mounted and locked to a bumper of the pickup truck outside a path of movement of a tailgate; and
   (b) a post removably mounted at a first post end to the base in a substantially vertical orientation in the manner of a cantilever and rigidly locked within the path of movement of the tailgate for limiting opening of the tailgate, said post extending from at least near a lower edge of the tailgate to near an upper edge of the tailgate.

19. The combination in accordance with claim 18, wherein the base telescopically extends into a base-receiving socket in said post.

20. The combination in accordance with claim 18, wherein the post telescopically extends into a post-receiving socket in said base.

21. The combination in accordance with claim 20, wherein the base has a rod that extends through an aperture in the pickup truck bumper.

22. The combination in accordance with claim 21, further comprising a handle cover mounted to said post and extending at least partially over a tailgate handle for restricting access to the tailgate handle.

23. The combination in accordance with claim 21, further comprising a transverse member mounted to said post and extending laterally from the post across a majority of the width of a tailgate opening.

24. The tailgate limiter in accordance with claim 1, wherein said post is within about six inches of the tailgate.

25. The tailgate limiter in accordance with claim 6, wherein said post is within about three to five inches of the tailgate.

26. The combination in accordance with claim 9, wherein said post is within about two inches of the tailgate.

27. The tailgate limiter in accordance with claim 18, wherein said post is within about one inch of the tailgate.

* * * * *